(12) United States Patent
Shimura et al.

(10) Patent No.: US 7,380,100 B2
(45) Date of Patent: May 27, 2008

(54) DATA PROCESSING SYSTEM AND CONTROL METHOD UTILIZING A PLURALITY OF DATE TRANSFER MEANS

(75) Inventors: Hiroshi Shimura, Tokyo (JP); Kenji Ikeda, Tokyo (JP); Tomoyoshi Sato, Ibaraki (JP)

(73) Assignee: IPFlex Inc., Tokyo (JP)

( * ) Notice: Subject to any disclaimer, the term of this patent is extended or adjusted under 35 U.S.C. 154(b) by 296 days.

(21) Appl. No.: 10/399,360

(22) PCT Filed: Sep. 6, 2002

(86) PCT No.: PCT/JP02/09108

§ 371 (c)(1),
(2), (4) Date: Jul. 23, 2003

(87) PCT Pub. No.: WO03/023602

PCT Pub. Date: Mar. 20, 2003

(65) Prior Publication Data

US 2004/0030815 A1    Feb. 12, 2004

(30) Foreign Application Priority Data

Sep. 7, 2001    (JP) ............................. 2001-272257

(51) Int. Cl.
*G06F 15/00* (2006.01)
(52) U.S. Cl. .................... 712/15; 712/24; 712/225
(58) Field of Classification Search ............. 712/225, 712/24, 10, 11, 15
See application file for complete search history.

(56) References Cited

U.S. PATENT DOCUMENTS 5,590,283 A * 12/1996 Hillis et al. ................. 712/29

(Continued)

FOREIGN PATENT DOCUMENTS

EP    1 443 392 A1    8/2004

(Continued)

OTHER PUBLICATIONS

PCT International Preliminary Examination Report for International Application No. PCT/JP2002/009108 dated Nov. 28, 2003.

(Continued)

*Primary Examiner*—Tonia L. M. Dollinger
(74) *Attorney, Agent, or Firm*—Marshall, Gerstein & Borun LLP

(57) ABSTRACT

The present invention provides a data processing system that includes a plurality of processing units and first, second, and third data transfer means. The first data transfer means connects a plurality of processing units in a network, exchanges first data, and configures at least one reconfigurable data flow by connecting at least two of the plurality of processing units. The second data transfer means supplies control information that loads setting data as second data to the plurality of processing units in parallel. The third data transfer means supplies the setting data to each of the plurality of the processing units individually. Setting data is data for setting a data flow with a different function by directly or indirectly changing other processing unit connected to a processing unit via the first data transfer means, and/or changing a process included in the processing unit.

19 Claims, 7 Drawing Sheets

U.S. PATENT DOCUMENTS

| | | | |
|---|---|---|---|
| 5,657,273 A * | 8/1997 | Ayukawa et al. | 365/189.01 |
| 5,760,607 A | 6/1998 | Leeds et al. | 326/38 |
| 5,778,439 A | 7/1998 | Trimberger et al. | |
| 5,784,636 A * | 7/1998 | Rupp | 712/37 |
| 6,026,461 A * | 2/2000 | Baxter et al. | 710/244 |
| 6,108,760 A | 8/2000 | Mirsky et al. | 711/203 |
| 6,122,719 A | 9/2000 | Mirsky et al. | |

FOREIGN PATENT DOCUMENTS

| JP | 2000-324102 | 11/2000 |
|---|---|---|
| WO | WO 00/079394 A1 | 12/2000 |

OTHER PUBLICATIONS

European Search Report based on PCT/JP0209108; Date of Completion of Search Jul. 5, 2007; Examiner Vivancos P. Bosch.

\* cited by examiner

DATA PROCESSING SYSTEM AND CONTROL METHOD UTILIZING A PLURALITY OF DATE TRANSFER MEANS

TECHNICAL FIELD

The present invention relates to a data processing system that forms data flows by connecting a plurality of processing units.

RELATED ART

U.S. Pat. No. 6,108,760 describes an art of connecting a plurality of processing elements on a network and performing processing. However, when setting new functions in the processing elements, it is necessary to supply data to the processing elements via the network, so that it is necessary to temporarily free up the data path or data flow that is formed by the processing elements and so make it possible for the network to supply the processing elements with the data required for the settings. This means that it takes time to supply data for settings from the outside to the processing elements and configure a data path with different functions. During such period, it is not possible to form a data flow and the elements become idle, which lowers the processing speed. In order to configure data paths with different functions in a short time, it is necessary to store all of the setting data beforehand inside the processing elements. It requires an extremely large memory capacity per each of the processing elements, which makes this an unrealistic solution.

In U.S. Pat. No. 6,108,760, both physical identification numbers and virtual identification numbers are assigned to each processing element, groups of arbitrary shapes, which are decided by the physical locations of the processing elements for realizing certain functions, are defined by masking a part of identification numbers of either type, and setting data and/or control data is/are supplied in units of groups. However, when the data flows are reconfigured, there is a high probability of significant changes in the shapes that include processing elements that realize the different functions. Accordingly, if each processing element is assigned a separate identification number so that the shapes corresponding to different functions can be expressed by masking some part of the identification numbers, such identification numbers become so redundant, with it taking a great amount of time to look up and use such identification numbers during programming. This increases costs and also reduces the flexibility of the system.

A method that supplies data to processing elements that are included in groups of arbitrary shapes that are determined according to the physical positions can reduce the time taken in cases where the same setting data is supplied to a plurality of processing elements that are arranged in concentrated groups. However, when the functions of the individual processing elements are different, it is ultimately necessary to supply setting data separately to the individual processing elements or processing units that compose the data flow, which makes it impossible to load setting data from the outside in a short time. This method is therefore incapable of achieving the fundamental aim of improving the processing speed.

In order to supply setting data separately to each processing element via a network, it must be possible to identify the respective processing elements. It is therefore necessary to assign separate identification numbers to each of the respective processing elements. To form groups of arbitrary shapes using such independent identification numbers, a complex system of identification numbers is required, with the control method and hardware for recognizing such identification numbers also being complex. This makes this solution uneconomical and makes it difficult to raise the processing speed.

It is an object of the present invention to provide a data processing system in which a plurality of processing elements or processing units are connected via a network, where setting data is supplied to each processing element and data paths and/or data flows with different functions can be set dynamically and/or in clock cycle units. It is a further object to provide a data processing system with a high degree of programming freedom, in which the processing units are appropriately identified for supplying setting data and/or control information simply without requiring complex processing, such as processing that assigns a complex system of virtual addresses to processing units and masks the system for use.

DISCLOSURE OF THE INVENTION

The present invention provides a data processing system that includes a plurality of processing units and a first, second, and third data transfer means. The first data transfer means connects the plurality of processing units in a network, exchanges first data, and configures at least one reconfigurable data flow by connecting at least two of the plurality of processing units. The second data transfer means supplies second data in parallel to the plurality of processing units. The third data transfer means supplies setting data to each of the plurality of the processing units individually. This setting data is data for setting a data flow with a different function by directly or indirectly changing other processing unit that is connected to a processing unit via the first data transfer means, and/or changing a processing included in the processing unit.

With this data processing system, setting data can be provided not by the network-like first data transfer means or the second data transfer means that broadcasts data but by the third data transfer means which is a dedicated bus that can supply data to each of the plurality of processing units separately. Accordingly, since there is no need to specify the address of each processing unit and to transfer the setting data in order, setting data can be provided to a plurality of processing units in a short time, such as one clock cycle. In addition, since there is no need to assign the address to each of the processing units when distributing setting data, virtual addresses and masking the address, which is troublesome processes, are unnecessary. The processing units that belong to a data flow can be indicated by identification information that simply shows the data flow.

The data flows in the present invention can be expressed as "functions" that are realized by taking over some or all of the processing units (hereinafter also referred to as "devices" and "elements") that can be connected by the first data transfer means that forms a network. Data is exchanged or distributed and processed within this function, with data being received from and outputted to outside the network at the ends of the function. The data flow is autonomously or heteronomously controlled, if there is a blockage on the data output side, for example, control is performed to temporarily halt the entire operation. As a general rule, data flows function independently, and internal information on the data flows is not actively exchanged between data flows.

When controlling the data processing apparatus or system of the present invention, a first process that supplies, via the third data transfer means, setting data and identification information showing the data flow to be set by the setting data, can attach the identification information that identifies the data flow to the processing units that configure the data flow identified by the identification information. Then in the second process, by supplying the identification information with the second data via the second data transfer means, a process is performed for selecting the second data based on the identification information that is supplied via the third data transfer means or the identification information that has previously been supplied. This makes it possible for a plurality of processing units to select the second data in units of data flows and to perform processing according to such second data. Accordingly, it is preferable for the processing units to include means for selecting and processing the second data based on identification information supplied via the third data transfer means.

The identification information that is used for selecting the second data can also be the identification information that is supplied by the third data transfer means at the timing at which the second data is supplied. In this case, as one example the setting data to be loaded in the processing units can be selected according to the identification information that is supplied together with the setting data, that is the identification information of the next data flow to which processing units belong.

In the second process, it is possible to select the second data based on the identification information supplied by the third data transfer means. In order to store the supplied identification information, it is preferable to provide the processing units with means, like a memory, for storing the identification information. In this case, setting data that to be loaded into the processing unit can be selected by the identification information that is stored in the processing unit together with the previous setting data, which is the identification information of the data flow to which the processing units presently belong.

According to the present invention, the most important content or context of the second data is control information (commands) that controls operation of the processing unit. In particular, by supplying, via the second data transfer means, a first command for loading setting data, it is possible for a plurality of sets of setting data to be set synchronously in at least part of the plurality of the processing units respectively using the identification information of the data flow to be configured by the sets of setting data. By doing so, the processing units become identify the data flows to which they belong from the identification information and thereafter can operate based on control information that is appended with identification information. The identification information does not need to be information that can specify each processing unit separately and may be simple information that is sufficient for identifying a data flow, which makes it possible to identify a large number of data flows with little data.

Also, by supplying, via the second data transfer means, control information for loading a set of setting data, the plurality of sets of setting data can be used by each of the plurality of processing units synchronously for configuring the data flows or functions and switched them instantaneously. Accordingly, new setting data can be dynamically loaded by the processing units that configure one particular data flow or data flows, then a new data flow or flows are configured.

A program or program product that controls the data processing system of the present invention includes instructions for executing processing that supply, via the third transfer means, setting data and identification information that shows the data flow to be set by the setting data and supply, via the second transfer means, control information for loading the setting data, with at least one of identification information. This program or program product can be provided by recording the program or program product on a suitable recording medium, and can alternatively be provided via a communication means such as a computer network.

The setting data includes a variety of information for configuring a data flow. For example, if the first data transfer means is a network that transfers the first data by indicating the address(es) of the processing unit(s) that is/are connected, the setting data includes the address(es) of the processing unit(s) to be connected. Alternatively, if the processing units to be connected are indicated by selecting and/or switching the wiring that composes the first data transfer means, the setting data includes selection or connection information for the wiring. In addition, if the processing units are capable of changing their own processing contents, the setting data includes information for changing process included in each of processing units for establishing a data path. Programmable processors are examples of processing units that are capable of changing their own processing contents. The processing units may also include a plurality of selectable internal data paths, with it being possible to select these internal data paths according to the setting data.

While a general-purpose processor is capable of flexible processing, there is a tradeoff between flexibility and processing speed and high costs are involved when improving the processing speed. On the other hand, a processing unit that includes a plurality of internal data paths is compact and inexpensive, is capable of high-speed processing, and still has a certain degree of flexibility. Accordingly, by arranging a plurality of processing units with different types of internal data paths and connecting these processing units with the first data transfer means in the form of a network, it is possible to construct a data processing system that is capable of performing a variety of processes at high speed. In addition, by using the present invention, the configuration of a data path or function can be changed dynamically.

In this data processing system of the present invention, the second data that is supplied with the identification information via the second data transfer means may be any data so long as it provides the data that needs to be supplied to a plurality of processing units with indicating a specified data flow. An important data as the second data is control information that controls the operations of the processing units, with one example of such information being a first command for loading setting data. Also, by supplying control information that has been appended with identification information showing a data flow via the second data transfer means, a plurality of processing units can be controlled in units of data flows. It is preferable for the data processing system to supply control information for controlling the operations of processing units with identification information that indicates data flows via the second data transfer means. Also, it is preferable for processing unit to include means for operating based on the control information with identification information to that the processing unit belongs. In the same way, it is preferable for a control method for the data processing system to include a process where, after identification information that shows a data flow and control information that controls the operation of the processing unit have been supplied via the second data transfer means, the processing unit operate based on control information with identification information that each of the processing units belongs to. In addition, it is preferable for the program (program product) that controls this data processing system to include instructions for executing process that supply, via the second data transfer means, control information, such as control commands, and identification information showing at least one data flow.

By supplying control information in parallel to a plurality of processing units, which are connected in a network and form a data flow or data path that has a function for performing processing for a predetermined operation, the data flow configured by these processing units can be precisely controlled in one clock cycle, for example, even when the plurality of processing units are dispersed. Accordingly, it is easy to synchronize and control a plurality of processing units that compose a data flow or to have a control processor perform such centralized control. As described above, the information that identify the data flows do not need to be information that identify each of the processing units, which makes the information simple and means that less hardware is required for processing. Accordingly, a data processing system with a high processing speed can be economically realized, and processing that switches between the plurality of functions that are provided in the processing units in one clock cycle to configure a data flow for a different function can be realized easily.

The control information is not limited to a command (the first command) for loading setting data, and includes a start command or a freeze or stop command (second command) that indicates a starting or stopping of the processing unit. It is possible to have the setting data loaded by a start command. By supplying a freeze command that indicates a stopping of the processing unit via the second data transfer means together with identification information, it is possible to synchronize and stop the processing of the processing units that compose the data flow(s) identified by the identification information. When it is necessary to start the processing of a data flow for a different function without waiting for the processing of presently constructed data flows to end and there are insufficient processing units, such control information is effective for freeing up processing units and reconfiguring data flows.

In addition, it is also effective to supply, as control information, a store command (third command) for storing a state when the operation of processing unit is stopped in a memory, and a load command (fourth command) for loading a state stored in the memory before the operation of the processing unit commences. When the processing of the reconstructed data flow(s) has ended and the original data flow(s) has/have been constructed, the stopped state is recreated. This means that the data processing system can operate reliably even when data flows are dynamically reconstructed using a limited number of processing units.

To make the processing units able to perform suitable processing for such commands and control information, it is preferable for the processing units to include means for loading setting data according to the second data, means for starting or stopping operations according to the second data, and saving means for stopping operations according to the second data and also storing internal information on that processing unit in a memory and for loading internal information stored in the memory and commencing the operations. These means are realized by logic circuits or microprograms or the like. Also, by storing the states of the processing units in the memory together with the identification information, the control information that starts the operation can be selected based on the identification information stored in the memory and data flows can be reconfigured.

The processing units referred to here may be remotely located. In this kind of data processing system, the processing units use a computer network such as the Internet as the first data transfer means, a means for broadcasting wirelessly or via wires as the second data transfer means, and a means that is capable of individual communications, such as a telephone network, as the third data transfer means. On the other hand, it is also possible to arrange the processing units on a circuit board such as a semiconductor substrate and so provide as a single processor. In this case, the first data transfer means is network circuitry that connects the plurality of processing units, the second data transfer means is a circuit that connects the plurality of processing units to a source or supplier of the second data, and the third data transfer means is a circuit that connects the plurality of processing units and a storage means that stores sets of setting data respectively correspondingly to each of the processing units. When control information is supplied as the second data, the supplier serves as a control apparatus.

A number of methods are applicable for supplying different setting data to the processing units via the third data transfer means. As a first method, a network setting memory capable of storing a plurality of sets of setting data for each of the plurality of processing units is provided, and in a first process of the control method, according to control by the control apparatus, a set of setting data that is to be set synchronously with at least part of the plurality of processing units is selected and supplied out of the plurality of sets of setting data stored in the network setting memory, then a command for loading is supplied in the second process. The amount of setting data that is supplied via the third data transfer means can be limited to the selected data sets, so that a narrow bus width is sufficient for the third data transfer means, though it becomes necessary for the control apparatus to control the network setting memory.

According to a second method, a plurality of sets of setting data that are stored in the network setting memory are supplied in the first process and a command for selectively loading one set of setting data out of the plurality of sets of setting data is supplied in the second process. With this method, while it is not necessary to control the network setting memory by the control apparatus, it is necessary to increase the bus width of the third data transfer means to make it possible for the processing units to select the sets of setting data. Even when the bus width of the third data transfer means is narrow, if there is sufficient memory capacity in the processing units and the time taken by data transfer is not a problem, a plurality of sets of setting data and identification information may be transferred in advance to the processing unit, with the functions of the processing unit being set by a load command that is supplied in the second process.

In the third method, sets of setting data that are stored in the network setting memory are supplied in the first process, and the sets of setting data in the network setting memory are rewritten by the control apparatus or the like in another process performed before the first process. With this method, the storage capacity of the network setting memory can be reduced, though it is necessary to perform a process that loads sets of setting data in advance into the network setting memory. Also, these first to third methods are not completely different methods, so that it is possible to use a combination of the methods as appropriate. For example, a suitable number of sets of setting data may be temporarily loaded into a suitable memory in the data processing system from an external memory, such as a ROM, a RAM, or a storage disc, which stores a large amount of setting data, with setting data that have been selected from this internal memory being supplied to the processing units. In addition, the bus width of the third data transfer means may be set so that two or a limited number of sets of setting data can be selected by the processing units, so that setting data that are frequently required to reconfigure the data paths can be selected merely using a command from the second data transfer means.

BEST MODE FOR CARRYING OUT THE PRESENT INVENTION

Figure 1:
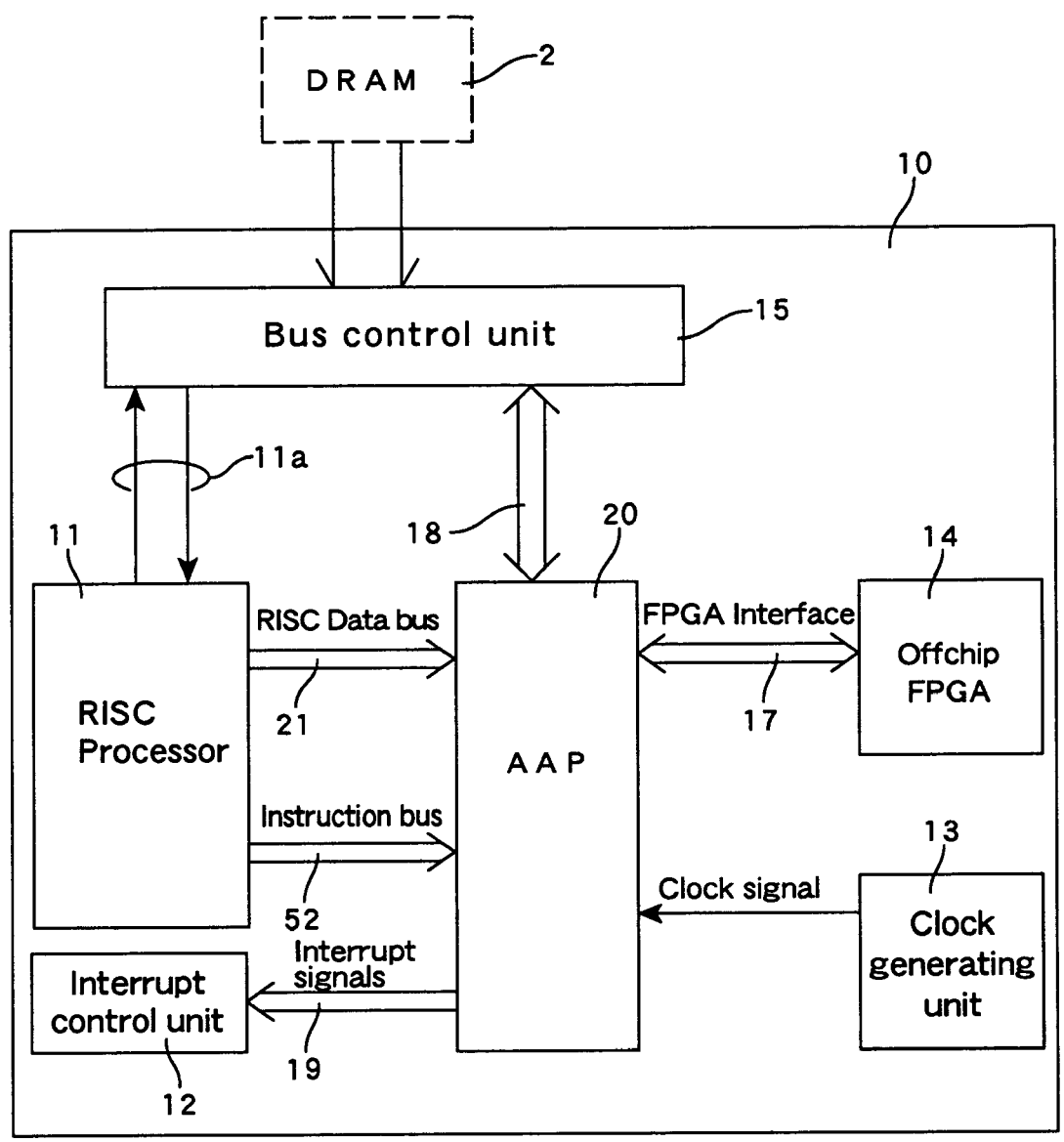
FIG. 1 is a block diagram showing the overall construction of an integrated circuit apparatus to which an embodiment of the present invention relates.

The following describes the present invention in more detail with reference to the attached drawings. FIG. 1 shows the overall construction of a system LSI 10 according to the present invention. This LSI 10 is a data processing system that includes a processor unit 11, an AAP (Adoptive Application Processor) unit 20, an interrupt control unit 12, a clock generating unit 13, an FPGA unit 14, and a bus control unit 15. The processor unit 11 has a general-purpose construction and performs general purpose processing, including error handling, based on instructions that are provided by a program or the like. In the AAP unit 20, data flows or virtual data flows that are suited to data processing of special-purpose applications are dynamically configured by a plurality of arithmetic and/or logic elements that are arranged in a matrix. The interrupt control unit 12 controls interrupt handling for interrupts from the AAP unit 20. The clock generating unit 13 supplies an operation clock signal to the AAP unit 20. The FPGA unit 14 further improves the flexibility of the operational circuits that can be realized by the LSI 10. The bus control unit 15 controls inputs and outputs of data to and from the outside. The AAP unit 20 is a configurable or reconfigurable unit in which data flows or virtual data flows that are suited to data processing are dynamically formed.

The AAP unit 20 and the FPGA unit 14 are connected by a data bus 17, so that data is supplied from the AAP unit 20 to the FPGA unit 14, processing is performed, and the result is then returned to the AAP unit 20. Also, the AAP unit 20 is connected to the bus control unit 15 by an input/output bus 18, and so can exchange data with a data bus on the outside of the LSI 10. Accordingly, the AAP unit 20 can receive an input of data from an external DRAM 2 or another device and can output a result produced by processing this data in the AAP unit 20 back to the external device. The basic processor unit ("processor unit" or "processor") 11 can also input and output data to and from an external device via a data bus 11a and the bus control unit 15.

The processor 11 and the AAP unit 20 are connected by a data bus 21, which makes it possible to exchange data between the processor 11 and the AAP unit 20, and an instruction bus 52, which supplies instructions so that the processor 11 can control the configuration and operation of the AAP unit 20. Also, interrupt signals are supplied from the AAP unit 20 to the interrupt control unit 12 via a signal line 19, and when the processing of the AAP unit 20 has ended or an error has occurred during such processing, the state of the AAP unit 20 can be fed back to the processor 11.

Figure 2:
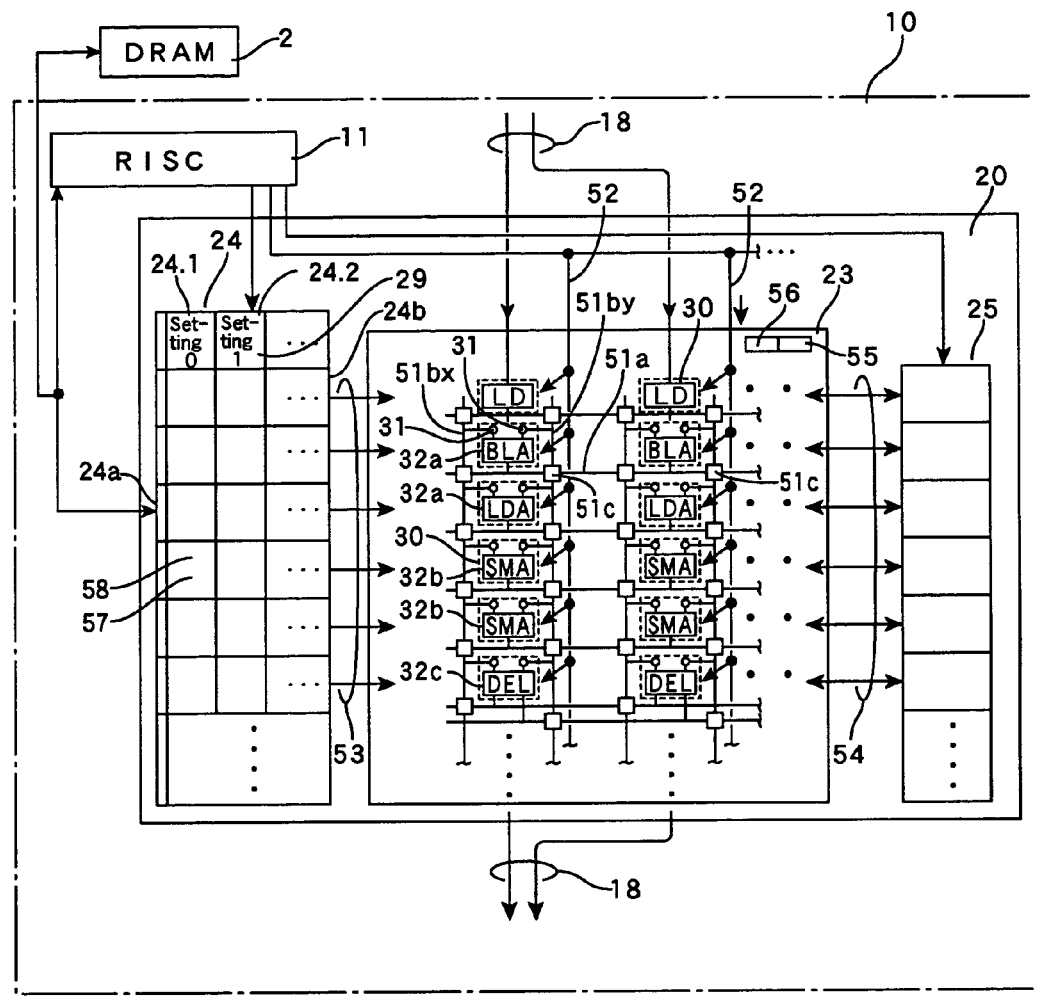
FIG. 2 shows the overall construction of an AAP unit.

FIG. 2 shows an outline of the AAP unit 20. The AAP unit 20 of the present embodiment comprises a matrix portion 23 in which a plurality of processing units (hereinafter "elements") 30 that perform arithmetic and/or logic operations are arranged in a matrix, a network setting memory 24 that supplies setting data 57 for forming a network to the matrix portion 23, and a save memory 25 for temporarily storing the state of the network.

The matrix unit or portion 23 includes a plurality of processing units, which is to say, the elements 30, with the elements 30 being arranged vertically and horizontally in an array or matrix. The matrix unit 23 includes first wire sets 51a and 51b that connect the elements 30 in a network, with these first wire sets 51a and 51b being arranged between the elements 30 as a first data transfer means. The wire sets 51a are row wire sets that extend in the horizontal direction, while the wire sets 51b are column wire sets that extend in the vertical direction. The column wire sets 51b are constructed from a pair of wire sets, 51bx and 51by, that are disposed on the left and right sides, respectively, of the operation units 30 aligned in the column direction, with these wire sets 51bx and 51by being generically referred to as the "wire sets 51b" and the actual supplying of data to the respective elements 30 being performed from these wire sets 51bx and 51by. Switching units 51c are arranged at the intersections of the wire sets 51a and 51b, with each switching unit 51c being able to switch and connect any of the channels of the row wire set 51a to any of the channels of a column wire set 51b. Each switching unit 51c includes a configuration RAM that stores setting data, with each switching unit 51c fundamentally receiving setting data in the same way as the elements 30 that are described below and being controlled by commands supplied from the processor unit 11.

This means that in the matrix unit 23 of the present embodiment, all or some of the plurality of elements 30 are connected by the wire sets 51a and 51b, so that data (the first data) can be routed among the elements 30 that are physically arranged apart from one another without consuming clock cycles. Accordingly, it is possible to dynamically configure one or a plurality of data flows using the plurality of elements 30 to perform the desired processing, with it also being possible to dynamically change these data flows with the desired timing.

The matrix portion 23 further includes a second wire set 52 that supplies control signals (commands) 55 from the processor unit 11 to each of the elements 30. In the present embodiment, this wire set 52 functions as a second data transfer means. The wire set 52 can transmit control data (the second data) 55 from the processor unit 11 that is the control apparatus to the elements 30 in parallel. To do so, the second wire set 52 has a function for broadcasting control data 55 from the processor unit 11 to the elements 30 in the matrix portion 23. When doing so, in the data processing apparatus 10, the processor unit 11 transmits the control data 55 having appended the control data with a data flow ID (hereinafter "DFID") 56 that is information for identifying a data flow.

The matrix unit 23 further includes a third wire set 53 that connects a network setting memory 24 and each of the elements 30 and supplies the setting data. Accordingly, in the present embodiment the third wire set 53 functions a third data transfer means. A two-port RAM is used as the network setting memory 24, with the network setting memory 24 including a first port 24a that is connected to the processor unit 11 and a second port 24b that is connected to the matrix unit 23. The network setting memory 24 can be controlled as a memory such as a normal RAM by the processor unit 11 via the first port 24a. The second port 24b is connected to the third wire set 53, thereby forming a dedicated data bus that connects the network setting memory 24 to each of the elements 30 in the matrix unit 23. Accordingly, the network setting memory 24 is a memory with a wide overall bus width.

Figure 3:
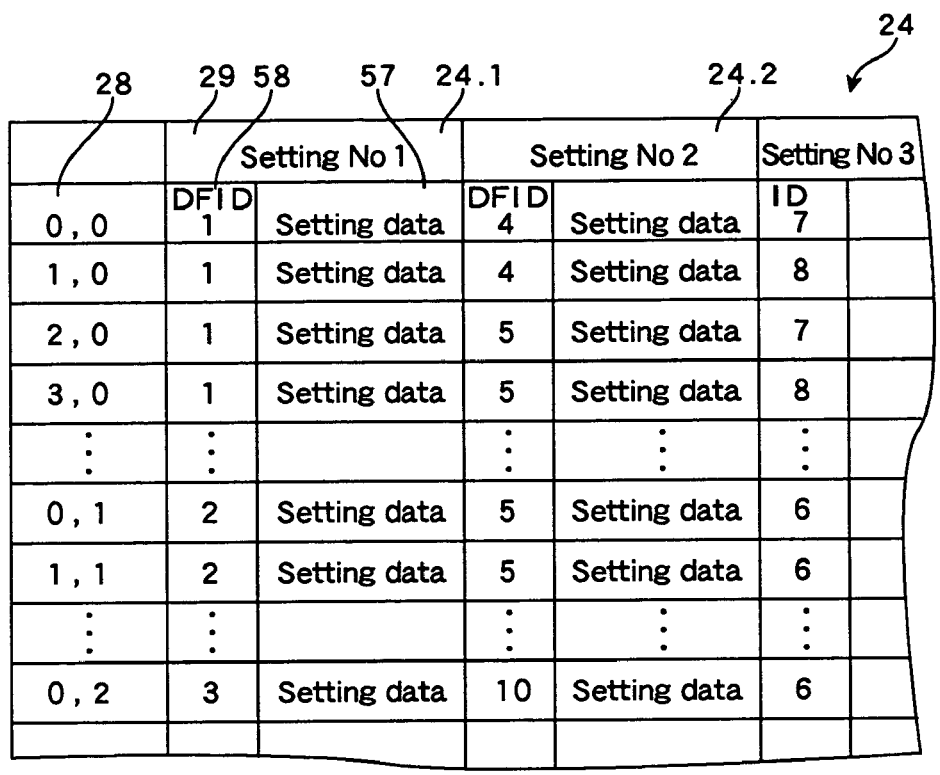
FIG. 3 shows an overview of a network setting memory.

As shown in the enlargement in FIG. 3, areas 28 that respectively correspond to each of the elements 30 are provided in one bank 24.1 of the network setting memory 24. As examples, there is an area (0, 0) corresponding to the element 30 on the $0^{th}$ row and $0^{th}$ column and an area (1, 0) corresponding to the element 30 on the $1^{st}$ row and $0^{th}$ column. These areas 28 may be defined physically, or by addresses in the network setting memory 24. A pair of DFID 58 and setting data (a set of setting data) 57 is stored in each of these areas 28. The combination of the DFID 58 and setting data 57 that is stored for corresponding to each element 30 is supplied to each element 30 individually via the third wiring set 53.

The network setting memory 24 includes a plurality of banks numbered 24.1 to 24.n, with each of the banks 24.1 to 24.n being assigned a different setting number 29 and storing different setting data 57. Accordingly, when a setting number 29 is indicated by the processor unit 11 that is the control apparatus of the matrix portion 23, the DFID 58 and a set of setting data 57 that correspond to this setting number 29 are supplied to each of the elements 30 respectively. According to the DFID 56 and the control data 55 supplied from the second wire set 52, the supplied setting data 57 that is provided individually for each element of the plurality of elements 30 is selected and used at the same time.

The content of the network setting memory 24 can be changed or updated by loading data, according to control by the processor unit 11, from an external memory such as a DRAM 2. When a large number of sets of setting data 57 can be stored in the network setting memory 24, the network setting memory 24 does not need to be updated very frequently, which can reduce the overheads of the processing time required by such updating. On the other hand, if only a set of setting data 57 can be stored in the network setting memory 24, the content of the setting data 57 supplied to the elements 30 can be controlled by only updating the network setting memory 24.

The matrix unit 23 further includes a fourth wire set 54 that connects each of the elements 30 to the save memory 25, so that the state of each element 30 can be inputted into and outputted from the save memory 25. The save memory 25 in the present embodiment is connected to each of the elements 30 in the matrix portion 23 by the fourth wire set 54 which is dedicated to this purpose. A memory for which a wide bus width can be formed is used, so that the state of each element 30 can be loaded or stored in one clock cycle or an extremely low number of clock cycles. On the other hand, if taking several clock cycles for loading and storing the states of the elements 30 is allowed, a memory with a narrow bus width can be used by providing a relaying selector.

Each element 30 arranged in the matrix portion 23 includes a pair of selectors 31 for selecting input data from the pair of column wire sets 51bx and 51by and an internal data path 32 that performs arithmetic and/or logic operation processing on the selected input data dix and diy and outputs output data do to the row wire set 51a. It should be noted that while internal data paths 32 that include a variety of functions are shown below, such internal data paths are commonly referred to as "internal data path units 32" below. In the matrix portion 23, elements 30 that include internal data path units 32 for different processing are arranged mainly in units of rows. In addition, wires for transferring carry signals are also provided in the wire sets 51a and 51b. The carry signals can be used as signals that show a carry or as signals that show true or false, and in the matrix unit 23, these carry signals are used for controlling the arithmetic operations and logic operations of each element 30 and for transferring results to other elements 30.

As examples, the elements 30 that are arranged on the first row at the top in FIG. 2 have a circuit that is suited to processing data from an input buffer of the bus control unit 15. The data path units LD for load operations that are arranged in this matrix unit 23 receive data from the load bus 18 and output the data to the row wire set 51a.

The elements 30 arranged on the second and third rows are elements for reading data from the external RAM 2, and are equipped with internal data path units 32a that are suited to generating the addresses required for loading data.

Figure 4:
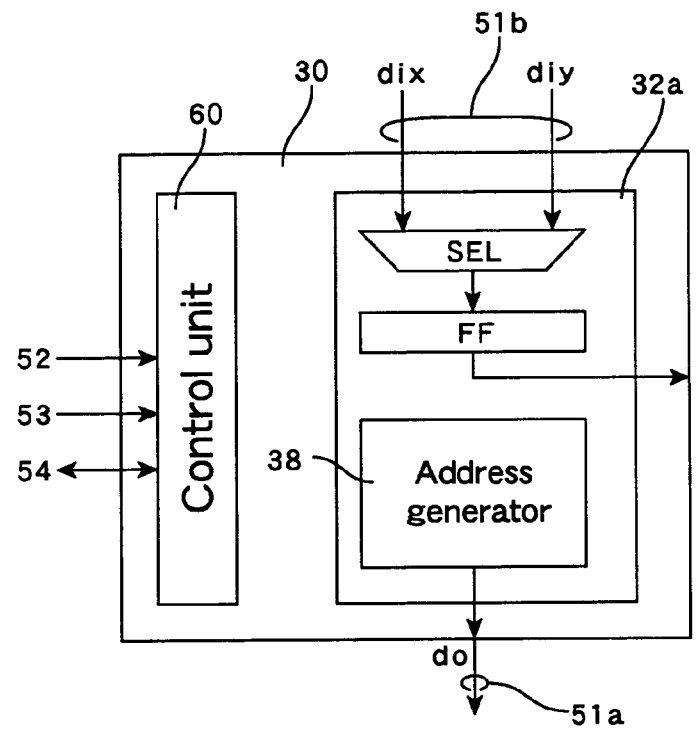
FIG. 4 shows an example of a data path unit that is suited to processing that outputs an address.

FIG. 4 shows an example of the data path unit 32a. This data path unit 32a includes an address generator 38 composed of a counter or the like, and outputs an address as the output signal do. This output signal do is supplied via the row wire set 51a and column wire set 51b as it is or after processing by other elements 30 to the data path unit 32a as the input signals dix or diy. The supplied address is selected by a selector SEL and is outputted via a flip-flop FF from the matrix unit 23 as an address for a data input.

These elements 30 include a control unit 60 for controlling the internal data path unit 32a, with the control unit 60 setting the functions of the internal data path unit 32a based on the setting data 57 loaded via the third wire set 53. An initial value or fixed value for the address generating circuit 38, a selection state for the selector SEL, etc., are set according to the setting data 57 in the internal data path unit 32a that generates an address.

These elements 30 also include a selector 31 for selecting the input data from the column wire sets 51bx and 51by, with the setting of this selector 31 also being made by the control unit 60 based on the setting data 57. The setting of each switching unit 51c that connects the row wire set 51a and the column wire set 51b is also made by the control unit 60 of each switching unit 51c based on the setting data 57. In the matrix portion 23, the elements 30 that are to be connected via the row wire set 51a and the column wire set 51b can be selected according to the setting data 57, so that data flows can be configured as desired. Also, by changing or selecting the functions of the internal data path units 32 according to the setting data 57, it is possible to change the process included in each element 30 within the range that can be supported in advance by the internal data path units 32, so that data flows can be constructed extremely flexibly.

Figure 5:
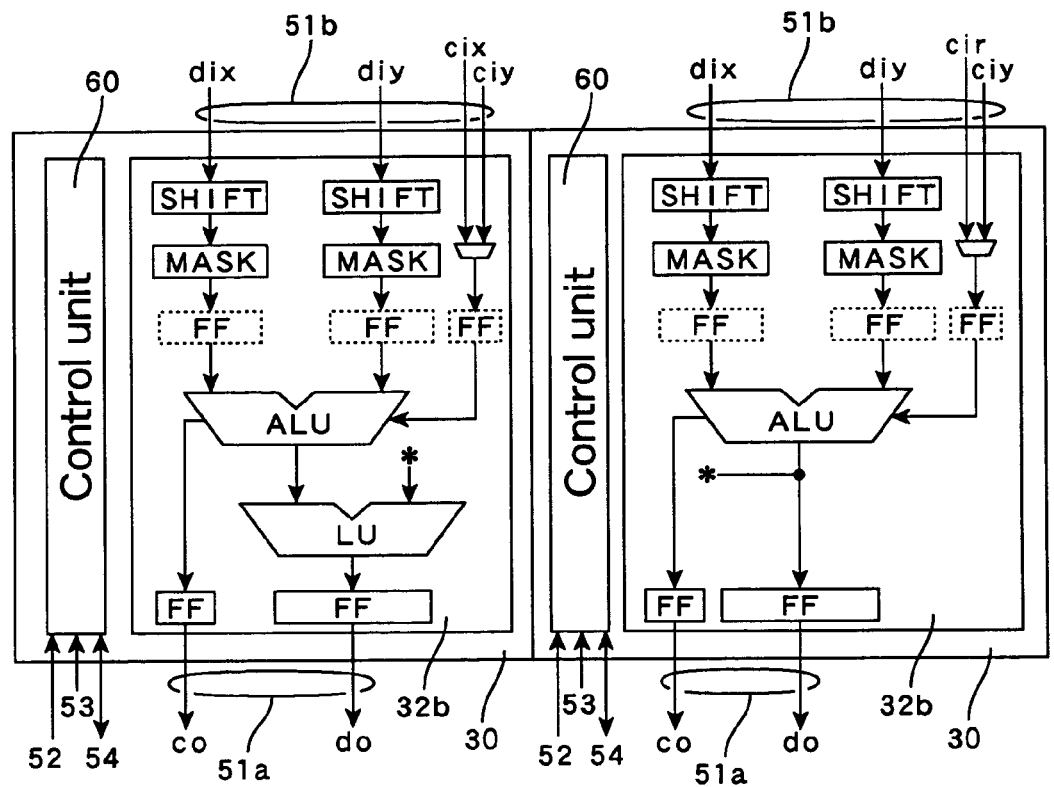
FIG. 5 shows an example of a data path portion that is suited to operation processing.

The elements 30 arranged on the fourth and fifth rows include data path units (SMA) 32b that are suited to arithmetic and logic operations. As shown in FIG. 5, a data path unit 32b includes a shift circuit "SHIFT", a mask circuit "MASK", and an arithmetic logic unit "ALU". In the same way as in the other elements, the states of the shift circuit "SHIFT", the mask circuit "MASK", and an arithmetic logic unit "ALU" are set by the control unit 60 based on the setting data 57. Accordingly, operations such as an addition, a subtraction, a comparison, a logical AND and a logical OR can be performed on the input data dix and diy, with the result being outputted as the output signal do.

Depending on the content of the processing in the matrix unit 23, a variety of elements 30 can be provided. For example, the elements 30 arranged on lower row include data path units (DEL) 32c that are suited to processing that delays the timing at which data is transferred. As one example, these data path units 32c can be composed of a plurality of selectors and flip-flops FF, with an input signal being outputted after being delayed by a desired number of clock cycles. It is also possible to provide a data path unit that includes a multiplier or the like and is suited to multiplication processing, a data path unit that acts an interface with an FPGA 14 that is provided on the outside of the matrix unit 23, and a data path unit that is suited to generating an address for outputting data and others.

As described above, each of these elements 30 has a data path that is suited to special-purpose processing or a special function, such as generating an address, with it being possible for the control unit 60 to change the configuration or function of the element based on the setting data 57. It is also possible to change the connections to other elements 30 in the matrix unit 23 using the first wire sets 51a and 51b. Accordingly, in the matrix portion 23 of the present embodiment, each of the elements 30 includes a data path or special-purpose circuit that is dedicated to special-purpose processing, so that processing can be performed at high speed in hardware. At the same time, by changing the connections between the elements 30 and/or changing the functions of the elements 30 within the limited range, the process performed in the matrix portion 23 are so flexibly changed.

An FPGA is also an architecture where the configuration can be flexibly changed by changing the connections between transistors, and is an integrated circuit apparatus where the functions can be freely changed after the circuit has been manufactured. However, an FPGA does not include actual logic gates such as AND gates and OR gates, so that even if an FPGA can function as a special-purpose operation circuit, the area efficiency of the FPGA is low, and the operation speed is also not especially high. Time is taken when the hardware in an FPGA is dynamically changed, and other hardware is required to reduce this time. This means that it is difficult to dynamically control the hardware during the execution of an application. FPGAs are not economic, either.

On the other hand, with the data processing apparatus 10 of the present embodiment that includes the matrix portion 23, a variety of types of elements that include data paths suited to appropriate or special-purpose processing are provided in advance, so that there is no need to change all the connections between transistors as with an FPGA. This means the hardware can be reconfigured in a short time, and since the present architecture does not need to have general-purpose applicability at the transistor level like an FPGA, the packing density is improved, making the system compact and economical. In addition, redundant parts of the construction can be omitted, so that the processing speed can be increased and favorable AC characteristics can be achieved.

Figure 6:
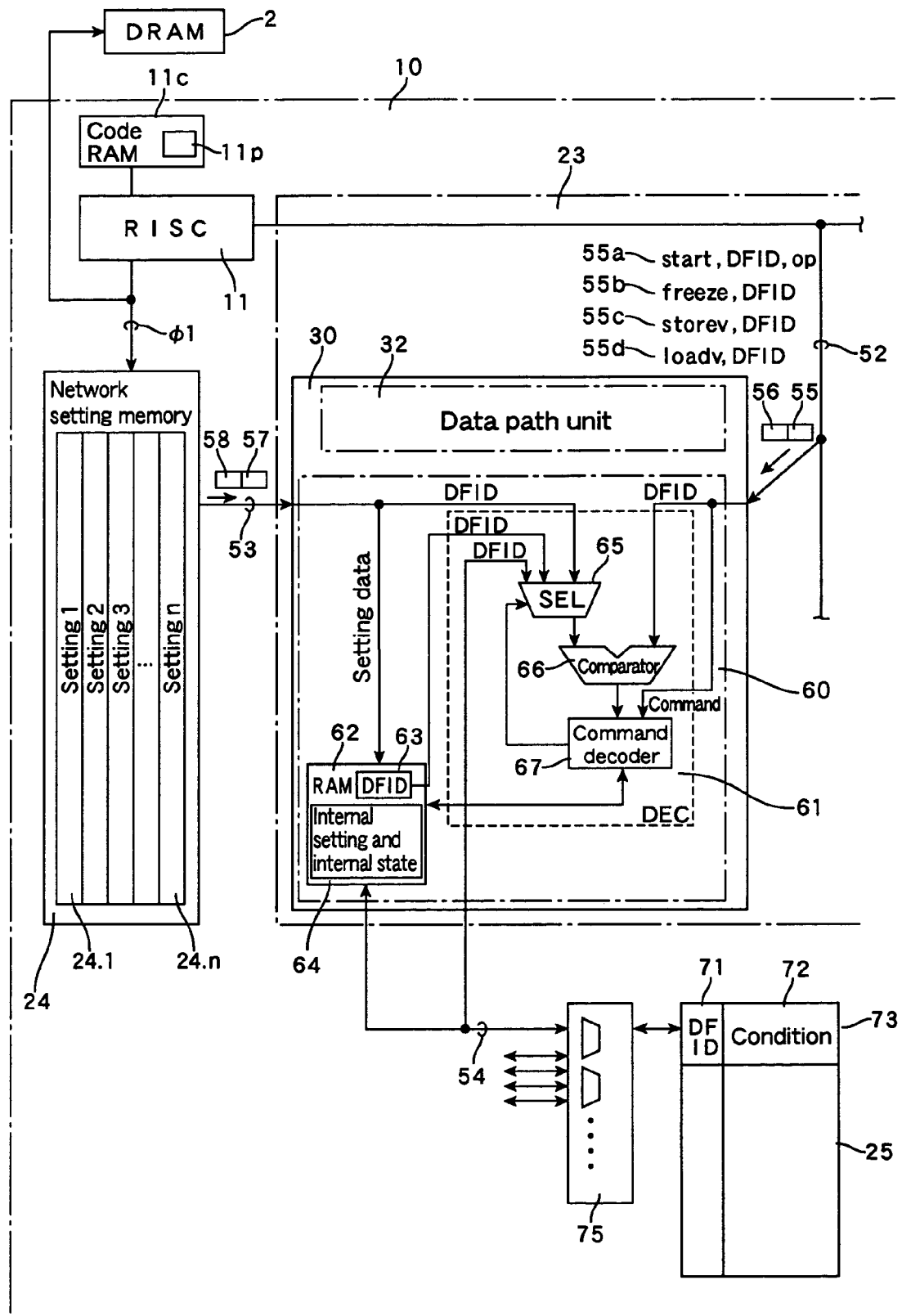
FIG. 6 shows a control unit of an element.

FIG. 6 shows the control unit 60 of an element 30. This control unit 60 includes a decode unit 61, which interprets information such as control commands supplied via the second wire set 52, and a configuration RAM 62, which stores setting data for the data path unit 32. A DFID 63 and internal information 64 that includes information of the internal settings and internal state are stored in the configuration RAM 62. The internal information 64 includes, namely, the setting data 57 that is supplied via the third wire set 53 and information that can trace the processing in the data path unit 32, such as an operation status of the data path unit 32. The setting data 57, as examples, includes control information on operation units in the data path unit 32, parameters such as initial values and fixed values, selection information on a path in the data path unit, and wiring between elements (which is to say selection information for the first row wire sets 51a and 51b). The configuration RAM 62 can be any rewritable memory and so may be a register, EEPROM, etc.

The decode unit 61 includes: a selector 65, a comparator 66 and a command decoder 67. The selector 65 selects one of a DFID 58 that is supplied from the third wire set 53, a DFID 63 that has already been supplied from the third wire set 53 and is stored in the configuration RAM 62, and a DFID 71 that is supplied from the save memory 25 that is described later. The comparator 66 compares the DFID selected by the selector 65 and the DFID 56 supplied from the second wire set 52. The command decoder 67 decodes and executes the control information (command) 55 supplied from the second wire set 52 when the comparator 66 finds that the DFIDs match.

Figure 7:
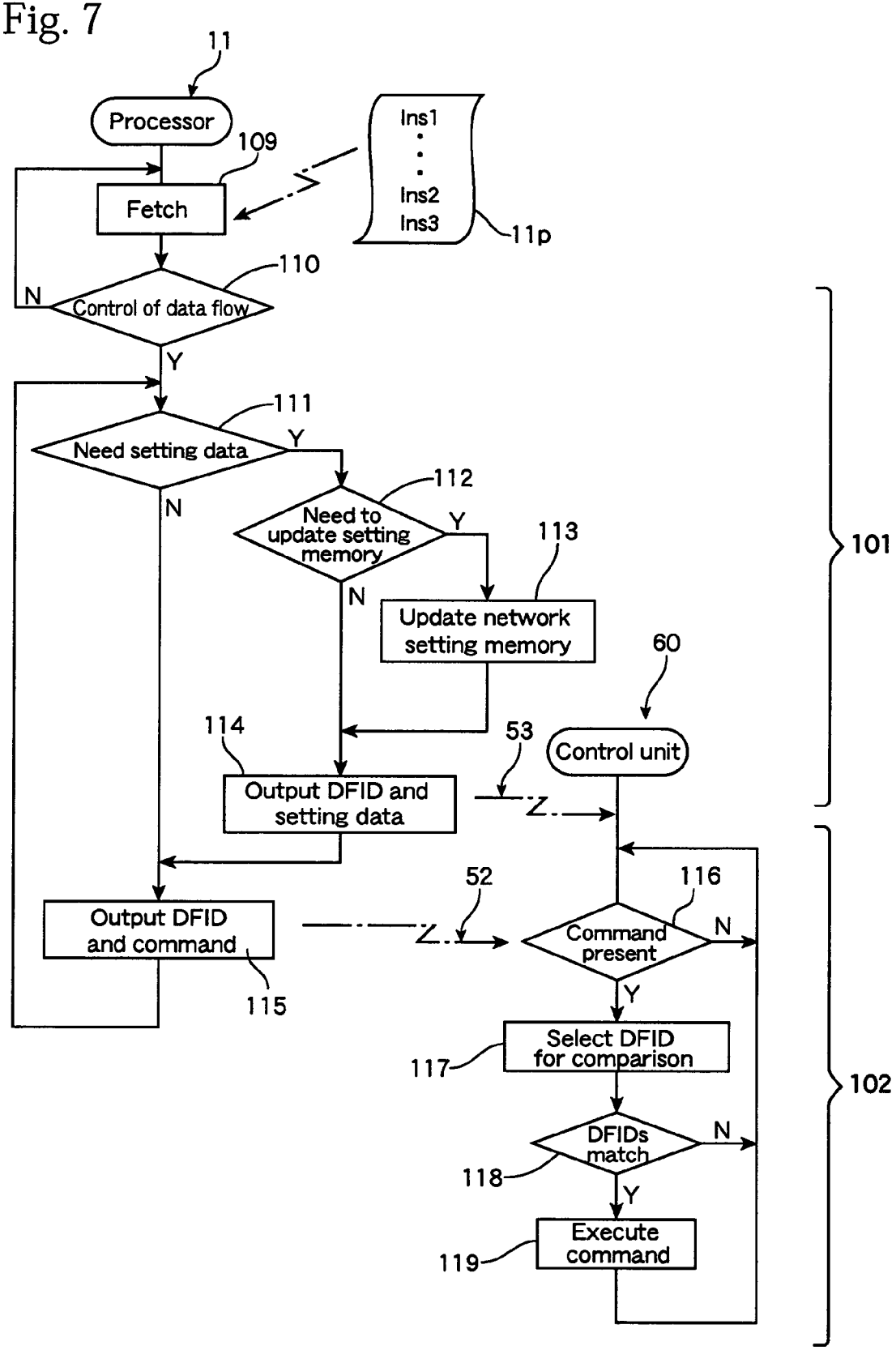
FIG. 7 is a flowchart that shows a control method of the data processing system.

FIG. 7 shows an overview of the processing in the data processing system 10 that sets and controls data flows in the matrix portion 23 through the processing of the processor 11 and the processing of the control units 60 of the elements 30. The control method of the data processing system 10 for data flows includes a first process 101 that supplies the DFID 58 and the setting data 57 via the third wire set 53 and a second process 102 that supplies the DFID 56 and the command 55 via the second wire set 52.

In step 109, the processor 11 fetches an instruction from a program 11p stored in a code RAM 11c, and in step 110, when the fetched instruction is an instruction for controlling the configuration of data flows in the matrix portion 23, the processor 11 executes the first process 101 and the second process 102. When the fetched instruction is an instruction that controls data flows that have already been configured, the processor 11 executes the second process 102. In the first process 101, when the processor 11 judges, based on the program 11p, in step 111 that it is necessary to supply new setting data 57, in step 114 the processor 11 supplies the DFID 58 and the setting data 57 from the network setting memory 24 to each of the elements 30 individually via the third wire set 53. At this point, when it is necessary to update the content of the network setting memory 24 (step 112), the processor 11 reads setting data 57 that is stored in the DRAM 2, etc., and updates the network setting memory 24 (step 113). This rewriting of the network setting memory 24 can be performed in units of banks, in units of setting numbers, or the entire contents of the network setting memory 24 are also be able to be updated.

In step 114, there are a number of methods for supplying different setting data 57 via the third wire set 53 to the intended elements 30. In a first method, in step 114, a set of setting data 57 that is to be loaded into an element 30 is selected out of the plurality of sets of setting data 57 that stored in the network setting memory 24 for that element and is outputted, with this set of setting data 57 being loaded in the second process 102 below. When there is little capacity in the network setting memory 24, such as when only one setting number can be stored, a set of setting data that has been updated in step 113 is supplied to the element 30. This corresponds to a third of the methods mentioned above.

In the second method, in step 114, a plurality of sets of setting data 57 that are stored in the network setting memory 24 for each elements are supplied in a state that enables the element 30 to select one set of setting data 57, and in the second process 102, the element 30 selects and loads the one set of setting data 57 from the plurality of sets of setting data 57 based on a command. With this second method, the operation of the network setting memory 24 by the processor 11 is reduced, which reduces the works of the processor 11, though the bus width of the third wire set 53 needs to be increased. It is also possible to have a plurality of combinations of setting data 57 and identification information 58 downloaded in advance into the configuration RAM 62, etc., of the control unit 60 in the elements 30, though this makes it necessary to provide sufficient memory capacity in the elements 30 and to provide sufficient time for transferring the data.

It is also possible to use a control method that is a combination of these methods. As one example, using the bus width of the third wire set 53 that can limited number of sets of setting data 57 such as two sets are selectable by an element 30, so that setting data that is often required when reconfiguring the data paths can be selected using just a command received via the second wire set 52.

In the second process 102, in step 115 the processor 11 supplies, based on the program 11p, the DFID 56 and the command 55 via the second wire set 52 to every element 30 in the matrix unit 23. In step 116, the control unit 60 of each element 30 receives the DFID 56 and the command 55 via the second wire set 52, and then in step 117, the control unit 60 selects the DFIDs that are to be compared with the DFID 56 supplied via the second wire set 52, which is to say, the control unit 60 selects a DFID that this processing unit 30 will belong to. In the present embodiment, as described above the selector 65 can select one of the DFID 58 supplied via the third wire set 53, the DFID 63 stored in the control unit 60, and the DFID 71 stored in the save memory 25. In step 118, when the selected DFID matches the DFID 56 supplied via the second wire set 52, the command 55 is executed in step 119.

In the data processing apparatus 10, when an instruction Ins1, which indicates an execution of a process that composes data flows with the DFIDs 1, 2, and 3 in the matrix portion 23 using the setting data stored with the setting number 1 in the network setting memory 24, is present in the program 11p stored in the code RAM 11c of the processor 11, in step 114, the processor 11 outputs a control signal φ1 for selecting the bank 24.1 in the network setting memory 24. In addition, in step 115 the processor supplies a start command 55a for forming the data flows to the elements 30 via the second wire set 52. One example of the start command 55a is shown below.

$$\text{start DFID, OP} \tag{1}$$

When, in step 118, the DFID 56 supplied together with the command matches the DFID selected by the selector 65, in step 119 the decoder 67 of the control unit 60 in the element 30 interprets and executes the start command 55a. In the present embodiment, a control signal for storing the setting data 57 supplied from the third wire set 53 is outputted to the configuration RAM 62. Here, as described above, a plurality of DFIDs or a single DFID can be issued together with the command 55.

The "OP" part of the start command 55a is composed of parameters for options. One parameter is information for selecting a setting number. When the bus width of the third wire set 53 is wide and sets of setting data 57 of a plurality of banks in the network setting memory 24, which is to say, sets of setting data 57 with a plurality of setting numbers is provided via the third wire set 53, a set of setting data with one of these setting numbers can be stored in the configuration RAM 62 by this parameter. Accordingly, the processor 11 does not need to select a set of setting data that is to be outputted from the network setting memory 24 or the processor 11 shall only make a selection of setting data in larger units, such as units of block. This makes it easy to control the network setting memory 24 and raises the processing speed. However, since it is necessary to provide sufficient bus width for the third wire set 53, the data processing apparatus 10 becomes larger.

The state of the selector 65 that is set in step 117 may be defined by the setting data 57 stored in the configuration RAM 62, or a command 55 that sets the state of the selector 65 may be supplied via the second wire set 52. It is also possible for the decoder 67 to decode the command 55 in advance and for the state of the selector 65 to be set by the command itself or by parameters that are appended to the command. In either case, the result of the decoding is executed only when the DFID selected by the selector 65 and the DFID 56 match.

When in step 117, the selector 65 selects the DFID 58 which has been supplied with the setting data 57 via the third wire set 53, the setting data 57 is updated in the elements 30 where this DFID 58 matches the DFID 56 indicated by the start command 55a. Accordingly, the DFID 56 which has been supplied with the start command 55a is the DFID that shows the data flow that is to be newly configured in the matrix unit 23.

On the other hand, it is also possible for the selector 65 to select the DFID 63 that is stored in the configuration RAM 62, which is to say, the DFID that identifies the data flow to which the element 30 currently belongs. In this case, the DFID 56 that is supplied together with the start command 55a is the DFID that indicates the data flow to be updated in the matrix portion 23.

In either case, the setting data 57 that is supplied to the plurality of elements 30 from the network setting memory 24 via the third wire set 53 can be synchronously set by the start command 55a in a plurality of elements 30 identified by the DFID 56 supplied with the command. Accordingly, there is no need to supply setting data to each element one by one, so that a new data flow can be configured at high speed, for example, in one clock cycle. In addition, the DFIDs that are used for these purposes do not need to include any information that identifies each element 30, so that as shown in the present embodiment, extremely simple data with a small data amount is sufficient. This makes it possible to provide a data processing apparatus 10 that can change the data flow extremely easily and at high speed.

In the data processing system 10, the address regions 28 of the network setting memory 24 that respectively correspond to the elements 30 are separately and directly connected to the control units 60 of each element 30 by the third wire set 53. Accordingly, if the bus width of the third wire set 53 is sufficient and the operation frequency is sufficiently high for delays caused by distance to be negligible, it is possible to use the address regions 28 in the network setting memory 24 that correspond to each element 30 as the configuration RAMs 62 without having to load the setting data 57 of the network setting memory 24 into the configuration RAM 62 in the control unit 60 of each element 30.

The following describes a number of example commands that use DFIDs in the data processing apparatus 10 of the present embodiment. First a halt command 55b that halts the operation of a data flow is as follows.

freeze DFID (2)

When attempting to change the data flow without halting the operation of the data flow, there is the possibility of erroneous operations being made during the switching or after the switching. As one example, when hardware resources that were performing memory accesses in each clock cycle before changing over are operational during the changing, access ends up being made to unexpected addresses. Even if such access does not cause a fatal error, external bus cycles are generated, resulting in at least a lowering of performance. There is also the possibility that when the data flow of the matrix unit 23 is dynamically switched, it may not be possible to reproduce the data flow. For example, when data flows are switched without stopping the data flows, the data flows end up operating even during the switch. If this happens, the next time the setting data is restored, the data flow is reproduced, and the processing is resumed, there are cases where a different result is obtained to when the data flow is not switched. This is to say, the internal information that is set back in each element that composes the data flow in order to reproduce the data flow can end up including both values from before the switch and values that have been rewritten during the switch.

Accordingly, if an instruction Ins2 for switching or changing the data flow is present in the program 11p, in step 115 the processor 11 issues, via the second wire set 52, a halt command (freeze command) 55b that indicates the intended data flow using a DFID and has the operation of this data flow halted. When the control unit 60 of an element 30 receives a freeze instruction 55b with a matching DFID, the operation of the element 30 is stopped. In addition to stopping the functioning of the data flow, this freeze instruction 55b may have a function for having the data flow restart the operation when the data flow is temporary stopping the functioning. In the data processing apparatus 10 of the present embodiment, information that identifies the data flows to which the elements 30 belongs is assigned in advance as DFIDs, so that by issuing a DFID together with a halt command 55b, there is no need to generate addresses if referring from the inside of elements.

By providing this kind of halt command 55b, a data flow that is on or under operation can be indicated and the functioning of this data flow can be stopped, thereby suppressing unnecessary bus accesses. Also, when the data flow is dynamically changed, the reproducibility of the data flow is ensured. Accordingly, this control method where DFID information that identifies a data flow is appended and the halt command 55b is supplied via the second wire set 52 so that the data flow is stopped and then operated is effective not just in a data processing system where elements are assigned DFIDs for each data flow via the third wire set 53 as in the present embodiment but also in a data processing apparatus where DFIDs are appended via a network, such as the first wire sets 51a and 51b in the present embodiment.

For a data flow is dynamically reconfigured, the store command 55c and load command 55d that have the data flow that is currently operating temporarily saved and then reactivated are as follows respectively.

Storev DFID

Loadv DFID (3)

When a number of processes are to be executed by the matrix portion 23, it is possible to perform a following process after first waiting for the processing that currently occupies the elements 30 in the matrix portion 23 to end. However, such control method is not suitable when the processing that is required is a high-priority process where real-time response is required. In the matrix portion 23, when elements that are coincidently not in use at the configuration can be collected to realize the next process, the configuration cannot proceed if the sufficient elements 30 are not available. Also, in a method where elements 30 that are available are collectively used, it is not possible to predict in advance which elements 30 will be available, so that the wiring method for wiring resources that connect the available elements 30, which is to say the arrangements of first row wire sets 51a and 51b, has to be calculated each time, which is time-consuming. This is also not suited to cases where real-time processing is required.

There is also a method where the processing that is currently being performed is interrupted, the other processing with high priority is executed, and the interrupted processing is recommenced from the beginning once the high-priority processing has ended. However, there is a clear waste of processing time in this case, and this method cannot be used when it is not possible to repeat the processing that has been interrupted.

On the other hand, in the data processing system 10, when an instruction Ins3 for executing a process with high priority is present in the program 11p, in step 115 the processor unit 11 issues a store command 55c with a DFID showing the data flow with the high priority. After the internal information 64 of the elements 30 that belong to this data flow has been stored in the save memory 25, the desired elements 30 are released. Next, based on the program 11p, in step 115 the processor unit 11 issues the start command 55a, so that the data flow for executing the high-priority processing can be configured and this processing can be performed. After this, in step 115, the processor unit 11 issues a load command 55d with the DFID for the data flow to be reproduced, so that the internal information 64 is loaded from the save memory 25, the saved data flow is reconfigured, and the processing can be resumed.

Accordingly, when high-priority processing is required, such as processing that needs to be performed in real-time, such processing can be given priority and executed by the matrix unit 23. When this high-priority processing ends, the suspended data flow is reconfigured, the suspended state is reproduced, and the processing can be resumed from the suspended state. By doing so, processing time is not wasted.

This means that when a store command 55c has been issued, in each control unit 60 of the elements 30, the DFID 58 supplied via the third wire set 53 is compared with the DFID 56 supplied via the second wire set 52 with the command 55c, and when these DFIDs match, in step 119 the processing is halted and the internal information 64 and the DFID 63, both in the configuration RAM 62, are stored in the save memory 25 via the fourth wire set 54. If sufficient time is available for writing such data, a parallel-serial conversion may be performed by a transfer circuit 75 that is composed of a selector and a switching circuit, which makes it possible to reduce the bus width of the wire sets and to reduce the bus width of the interface of the save memory 25.

Also, if it is possible to provide sufficient capacity in the configuration RAM 62 of the control unit 60 in each element 30 for storing the internal information and DFID to be saved, it is also possible to use the configuration RAM 62 as the save memory. In this case, if the internal information 64 is written in a mirror state in the bit region used as the save memory or register while the element 30 is in usual processing, processing for saving the internal information 64 according to a store instruction 55c becomes unnecessary.

While the functioning of a data flow is described as being halted according to a store instruction 55c, the functioning of the data flow can be stopped in advance by issuing a freeze instruction 55b before the store instruction 55c. When an array of the elements 30 that are required to configure the data flow to be processed with priority does not match the array of elements 30 that configure the data flow to be saved, a store instruction 55c or a freeze instruction 55b that indicates the DFID or DFIDs of the data flows to be saved should preferably be issued. In this case, by comparing this DFID with the DFID 63 stored in the configuration RAM 62 of each element 30, the internal information 64 of the suitable elements 30 can be saved.

When the DFID 56 of the data flow to be restored is issued together with a load command 55d, in step 118 the control unit 60 of each element 30 compares the DFID 56 with the DFID 71 stored in an address region 73, which corresponds to the each element 30, in the save memory 25. When these DFIDs match, in step 119, the internal information (condition data) 72 that has been saved in the save memory 25 is loaded into the configuration RAM 62. When the internal information 64 of every element 30 that composes the data flow with the indicated DFID 56 has been restored, the processing that was suspended is resumed.

In this control method, data flows are dynamically reconfigured by temporarily saving the data flows that are operational and being re-operational the data flows by supplying, via the second wire set 52, the store command 55c and load command 55d together with the DFID information for identifying the data flows as described above, though this control method is not limited to a data processing system where DFIDs are assigned to elements for each data flow via the third wire set 53 as in the present embodiment. As one example, this control method is also effective in a data processing system where DFIDs are assigned via the first wire sets 51a and 51b that compose the network.

Figure 8:
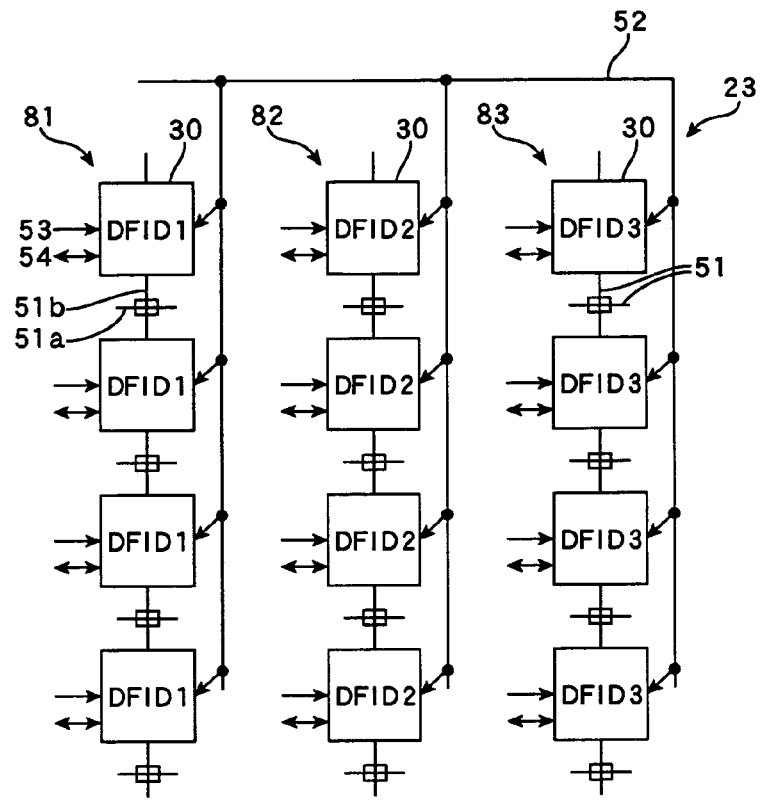
FIG. 8 shows an example configuration of a data flow in the matrix portion.

FIG. 8 shows a state where a command φ1 that indicates the setting number [1] for the network setting memory 24 is issued from the processor 11, and a start command 55a with identifications [1,2,3] as the DFIDs 56 is issued via the second wire set 52 to the matrix portion 23. In each element 30, sets of setting data 57 with the DFID 58 [1], [2], or [3] is supplied from the network setting memory 24 by the third wire set 53 to the corresponding configuration RAMs 62 of elements 30 and the set of setting data 57 is latched or stored respectively. The second wire set 52 and the third wire set 53 are also connected to the switching units 51c that belong to the first wire sets, if necessary, connection information for the first wire sets 51a and 51b also being provided. With this construction, after a start command 55a has been issued, elements 30 are connected by the first wire sets 51a and 51b in a short time, such as one clock cycle, a data flow 81 with the DFID [1], a data flow 82 with the DFID [2], and a data flow 83 with the DFID [3] are configured, and processing is commenced.

Next, when a freeze command 55b is issued from the processor 11 with identifications [1,2] as the DFIDs 56, the operations of the elements 30 that belong to the corresponding data flows 81 and 82 are halted, thereby suspending the processing in the data flows 81 and 82. However, the processing by the elements 30 that belong to the data flow 83 that is not indicated by the DFIDs 56 is continued.

Figure 9:
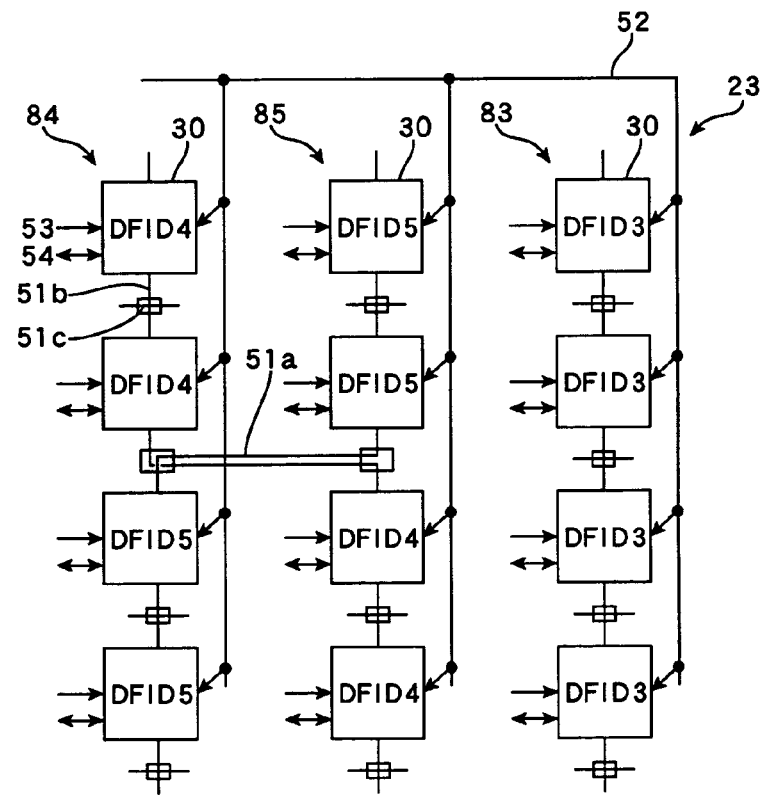
FIG. 9 shows an example configuration of a different data flow in the matrix portion.

After this, the command φ1 that indicates the setting number [2] for the network setting memory 24 is issued from the processor 11, and a store command 55c with indications [4,5] as the DFIDs 56 is issued to the matrix portion 23 from the processor 11. Based on the DFIDs 58 that are supplied from the third wire set 53, the internal information of the elements 30 required for constructing a data flow, which is to say, the elements 30 that configured the current data flows 81 and 82, are stored in the save memory 25 via the fourth wire set 54. If necessary, the states of the switching units 51c that belong to the first wiring set are also stored in the save memory 25. The sets of setting data 57 with the DFIDs 58 [4] and [5] that are supplied from the network setting memory 24 via the third wire set 53 are stored in the corresponding configuration RAMs 62 of elements 30 respectively. In this way, as shown in FIG. 9, a data flow 84 with the DFID [4] and a data flow 85 with the DFID [5] are configured and processing is commenced.

Accordingly, after the store command 55c has been issued, the configuration of the matrix portion 23 is switched or changed within a few clock cycles and processing commences according to the new data flows. During this time, the processing by the data flow 83 continues without being suspended.

Once the processing in the data flows 84 and 85 end, a load command 55d with indications [1,2] as the DFIDs 56 is issued from the processor 11 to the matrix portion 23. This load command 55d has the internal information 72 of the elements 30 corresponding to the DFID 71 that were saved in the save memory 25 stored in the configuration RAMs 62 via the fourth wire set 54 and, as shown in FIG. 8, has the data flows 81 and 82 reconfigured. The internal states of the elements 30 belonging to each of the data flows 81 and 82 are restored to the same states as when the processing were suspended, so that by commencing processing according to these data flows 81 and 82, the processing can be resumed from the point where the processing were suspended.

In this way, in the data processing apparatus 10 of the present embodiment, a plurality of functions can be easily realized by the matrix portion 23 in which the plurality of elements 30 can be connected in a network by the first wire set 51. It is possible to have elements, i.e., the devices composing the network, selectively operate by merely investigating whether the DFIDs to be assigned to the elements 30 indicate that execution is possible. Accordingly, it is easy for the processor 11 or another control apparatus on the outside of the matrix unit 23 to request the elements 30 in the matrix unit 23 to perform processing. That is, when there is a request from outside for a certain function, or a data flow, in the network, it is sufficient to indicate a DFID that is identification information for that function.

It is also possible to provide a program or program product 11p that includes instructions for executing processing that has the processor 11 issue the type of commands described above in order to change the configuration of the network (data flows) of the matrix unit 23 and to control the data flows. By changing the content or order of the instructions in the program 11p, it is possible to change the processing executed by the data processing apparatus 10, which is realized as a system LSI or the like, from the hardware configuration stage. It is also possible to change the processing executed by the data processing apparatus 10 from the hardware configuration stage by replacing the content or context of the network setting memory 24. Accordingly, the present invention can provide a data processing system that can execute processing of different data flows and different data paths at the processing execution stage even though the same construction is provided as the hardware resources.

The method for using the DFIDs is not limited to that described above. As one example, the DFID [0] can be used to indicate every element 30, so that a command can be supplied to every element 30 and the setting data in all of the elements 30 can be updated without affecting the DFIDs 58 supplied from the third wire set 53 and the DFIDs 63 stored internally. The DFID [-1] can be used to indicate data that is unrelated to the elements 30 and the second wire set 52 can be used other control that is unrelated to the control of the elements.

In addition, the data provided from the second wire set 52 is not limited to control commands. The data flows constructed from elements arranged in a network often repeat the same type of operations, though the coefficients of such operations are changed often. Accordingly, in the present system 10, the coefficients can be changed according to data supplied from the second wire set 52 without changing the content of the network setting memory 24, which is to say, without changing the setting data 57. The setting data 57 of the network setting memory 24 can also be reused with only the parts that need to be changed being amended by the processor 11, so that by supplying a start command 55*a* from the second wire set 52, the setting data 57 can be set in the elements 30 any number of times.

Like an ordinary memory, the network setting memory 24 may also be directly rewritable for the processor unit 11 that is the control apparatus. This allows great freedom to programmers. If such a memory is hidden in each element and cannot be directly rewritten by the processor unit 11, another method shall be used where other identification information that identifies each element individually, such as an address, is provided to each element separately together with the setting information. Such another method requires repeat of the same operation a number of times equal to the number of elements that compose a data flow, which makes this extremely time-consuming. The circuits also operate inefficiently, which increases power consumption. While it is possible to use more another method where the elements are connected in a tree pattern, and an address showing a desired element is inserted together with the setting information into the roots of the tree, this also takes time and makes a partial amendment of the data flows difficult.

The network setting memory 24 of the present embodiment is connected directly to each element 30 by the third wire set 53 that has a wide overall bus width. This means that the settings can be made at high speed in one clock cycle. Control requests (suspend, resume) and DFIDs identifying the control targets are transferred or broadcast to the elements 30 by the second wire set 52, which such control also being performed in one clock cycle.

In addition, the setting data 57 that is stored in the network setting memory 24 may be generated at any time by the processor 11. It is also possible for part of sets of the setting data that has been prepared in advance and stored in the external DRAM 2 or the like to be downloaded into the network setting memory 24 by the processor unit 11 and then used.

While the arrangement of the wire sets described above are exemplary shown, the present invention is not limited to such description. It is sufficient for the first wire sets 51*a* and 51*b* that function as the first data transfer means to be wires or a data transfer means that can be flexibly routed between elements. As one example, by increasing the number of input selectors, or by increasing the number of inputs, each appliance can be made capable of more complicated operations. More complicated operations are also possible by increasing the number of output selectors, or the number of outputs. In addition, there is no need for the output selectors and outputs to be connected in a one-to-one fashion, and one output may be connected to a plurality of selectors or a plurality of outputs may be connected to one selector. The network may be constructed, if time consuming for communication between elements is sufficient, data can be sent and received by indicating the addresses of elements.

The second wire set 52 that functions as the second data transfer means may be provided with an appropriate number of signal lines for the possible types of DFID, with such signal lines being used to show the different DFIDs. Such modification can also be applied for the third wire set 53.

The data processing apparatus 10 described above is an example where the present invention is embodied in a processor apparatus or LSI apparatus where the elements 30 are mounted on a semiconductor substrate. Accordingly, the present invention can provide an LSI or an ASIC that can perform real-time processing with favorable AC characteristics, where data flows that are suited to the processing of an application can be dynamically reconfigured and hardware resources can be used with the greatest possible efficiency.

The LSI apparatus 10 of the present embodiment is also characterized in that by changing the program 11*p* and/or the setting data 57, it is possible to put an LSI with the same hardware resources to a plurality of uses and applications. The program 11*p* and/or the setting data 57 can be provided separately to the data processing apparatus by storing the program and/or setting data in a suitable recording medium, such as a ROM that can be distributed independently, or can be provided via a communication means such as a computer network. This means that by changing or updating the program 11*p* and/or the setting data 57, it is possible to improve the processing performance of and add new functions to an LSI or an information processing terminal or the like in which such an LSI is used. This means that the functions of an LSI that are essentially fixed at the end of the development stage can be changed in the same way as a firmware upgrading, which greatly reduces the burden of manufacturers during design and manufacturing and makes it possible to provide users with an LSI apparatus that can always be used in an optimal condition.

Also, according to the present invention, the plurality of processing units (the "elements" in the example described above) that are connected by a network to realize a given function can be different semiconductor apparatuses, different circuit boards, or even devices that are remotely provided. In the data flows in the present invention, the following functions can also be realized. First, some or all of the devices that can be connected in a network are used to form a data flow, data is passed over in or along this data flow and processed, with the devices at the respective ends of the data flow receiving the data from outside the network and outputting the processed data out of the network. The parts composing this data flow are autonomously or heteronomously controlled, so that as one example control is performed to temporarily stop the entire operation of the data flow if there is a blockage at the output side. Also, data flows do not actively exchange information between one another during the processing and are fundamentally procedures that operate independently of one another.

As described above, with the present invention, processing (setting, control and execution) can be easily realized for such "functions". The "setting" stage defines a "function" by selecting devices that compose the "function" and assigning roles to each of the devices. A request for such setting can be issued from outside the "function". The "control" for a "function" is starting and stopping of the operation of the "function", and controlling can be issued from outside the "function".

The "execution" refers to the autonomous operation of the "function", and includes synchronization control and the like that occurs during the operation of the "function". Such "execution" is thought to include the following. First is the synchronization of input data. When operations are performed by an ordinary device, usually, there are two or more sets of input data. In such cases, all of the input data should preferably be inputted into the devices simultaneously. If the inputs into a network are associated with the "function", when the inputs are received into the network, flow control of input data can easily synchronize a plurality of sets of input data and inputs them into the "function". Second is flow control over output data. When there is a blockage for outputs from the network (a buffer apparatus is provided in many cases for the output of the network, and such blockages correspond to when the buffer apparatus is full), should the "function" continue to output data, the output data will simply be lost. However, if the output of the network is associated to the "function", the network can indicate blockage to the "function" and the "function" can therefore autonomously stop operating until outputting becomes possible once again. The present invention makes it possible to perform centralized management using identification information (DFIDs) that indicate "functions" without eliminating the possibility of having centralized control performed by a control apparatus in the network. This means that if the above phenomenon (i.e., a blockage) is detected by a monitoring apparatus, it is possible to instruct each "function" to temporarily stop and then resume operations.

The above is different to the identification method used in conventional systems where devices are arranged and operated in a network, and in particular differs from an LSI architecture. Each of the devices composing the network is assigned fixed or dynamic identification information (an ID or address). However, when a network is constructed between devices and data is transferred, the assigning of fixed or dynamic IDs that one-to-one correspond to the devices produces only redundant information in cases where the devices that are to operate can be specified using the physical positions of such devices. In addition, in cases when a plurality of "functions" are present in the network, assigning separate IDs to each devices does not facilitate the operation for one of such "functions". An operation that has each of the devices operate by indicating each device individually is clearly redundant, with wiring and processing time being wastefully used for indicating devices.

By combining all of the devices to realize a single "function", it becomes possible to eradicate the need to identify devices for control, though since a plurality of "functions" cannot be performed simultaneously, such method makes wasteful use of hardware resources. While it is possible to regard different IDs as the same according to certain special rules, such as by using a method where some of the IDs of the devices are masked to leave others, this is merely a compromise for the problem of the inability to supply different settings for individual devices from outside without individually indicating the IDs of the devices, so that the fundamental problem remains. This means that IDs have to be wastefully assigned to each device, which reduces the clarity and flexibility of programming. Also, there is still the problem of having to access each of the devices one by one in order to make different settings in each device, so that the functions cannot be dynamically switched in a short time.

On the other hand, with the present invention, by introducing a third data transfer means that multiply distribute setting data to individual devices and assigning identification information to the "functions" themselves that are dynamically defined in a network, the redundancy described above can be eradicated, programming is made easier, and a simple construction that is sufficient for the setting, control, and operation of "functions" is realized.

INDUSTRIAL APPLICABILITY

The data processing system and control method of the present invention can provide as system that is capable of a variety of data processing such as a system LSI and ASIC. The data processing system of the present invention is not limited to electronic circuits, and can also be adopted in a data processing apparatus that is based on optical circuits or optical-electronic circuits. The data processing system of the present invention can execute data processing at high speed using reconfigurable hardware, and so is suited to a data processing apparatus for high-speed and real-time processing, such as network processing and image processing.

The invention claimed is:

1. A data processing system, comprising:
a plurality of processing units;
first data transfer circuits for connecting the plurality of processing units in a network, exchanging first data, and configuring at least one reconfigurable data flow by connecting at least two of the plurality of processing units;
second data transfer circuits that are different from the first data transfer circuits for supplying, independently of the first data transfer circuits, second data to each of the plurality of processing units in parallel from a control apparatus; and
third data transfer circuits that are different from the first and second data transfer circuits, for supplying, independently of the first and second data transfer circuits, setting data to each of the plurality of processing units individually from a network setting memory, the setting data being data for setting a data flow, corresponding to a function, by changing a set of connections between processing units of the plurality of processing units connected with the first data transfer circuits, or by changing a process included in the processing units,
wherein the network setting memory stores sets of setting data and identification information for each of the plurality of processing units, the identification information identifying the processing units connected by the first data transfer circuits for configuring a particular data flow, the third data transfer circuits supplying the identification information together with the setting data,
wherein the control apparatus issues control information with the identification information as the second data for controlling operation of the processing units, and wherein each of the plurality of processing units includes a control unit that operates based on the second data, wherein the second data is selected based on the identification information supplied via the third data transfer circuits.

2. A data processing system according to claim 1, wherein each of the plurality of processing units includes a memory for storing the identification information.

3. A data processing system according to claim 1, wherein the control unit is adapted to load the setting data according to the second data.

4. A data processing system according to claim 1, wherein the control unit is adapted to start or stop operation according to the second data selected.

5. A data processing system according to claim 1, wherein the control unit is adapted to store, in a save memory, internal information on the processing unit when stopping an operation according to the second data and commencing another operation after another internal information saved in the save memory has been loaded.

6. A data processing system according to claim 5, wherein the saving means stores the identification information together with the internal information in the save memory.

7. A data processing system according to claim 1, wherein the processing unit further includes a plurality of selectable internal data paths, and the setting data includes data for selecting the internal data paths.

8. A data processing system according to claim 1, wherein the network setting memory stores a plurality of sets of setting data for each of the plurality of processing units, and the control apparatus selects the set of setting data, from the plurality sets of setting data, that is to be set synchronously with at least part of the plurality of processing units, has the selected set of setting data outputted from the network setting memory, and issues, as the control information, a command for loading setting data.

9. A data processing system according to claim 1, wherein the network setting memory stores a plurality of sets of setting data for each of the plurality of processing units, and the control apparatus issues, as the control information, a command for selecting the set of setting data from the plurality of sets of setting data in the network setting memory and loading setting data.

10. A data processing system according to claim 1, wherein the control apparatus changes the plurality of sets of setting data in the network setting memory.

11. A data processing system according to claim 1, wherein the circuit board is a semiconductor substrate.

12. A control method for a data processing system, wherein the data processing system includes a plurality of processing units, first data transfer circuits for connecting the plurality of processing units in a network, exchanging first data, and configuring at least one reconfigurable data flow by connecting at least two of the plurality of processing units, second data transfer circuits that are different from the first data transfer circuits for supplying, independently of the first data transfer circuits, second data to the plurality of processing units in parallel from a control apparatus, and third data transfer circuits that are different from the first and second data transfer circuits, for supplying, independently of the first and second data transfer circuits, setting data to each of the plurality of processing units individually from a network setting memory, the setting data being data for setting a data flow, corresponding to a function, by changing a set of connections between processing units of the plurality of processing units connected with the first data transfer circuits or by changing a process included in the processing units, wherein the network setting memory stores sets of setting data and identification information for each of the plurality of processing units, the identification information identifying the processing units connected by the first data transfer circuits for configuring the data flow,
the control method comprising:
supplying, via the third data transfer circuits, the identification information and together with the setting data; and
issuing, from the control apparatus, control information with the identification information as the second data via the second data transfer circuits, and operating a control unit included in each of the plurality of processing units according to the second data selected, based on the identification information that is supplied via the third data transfer circuits or the identification information that has been previously supplied.

13. A control method according to claim 12, wherein the control information includes a first command for loading the setting data into the processing unit.

14. A control method according to claim 12, wherein the control information includes a second command for starting or stopping operation of the processing unit.

15. A control method according to claim 12, wherein the control information includes a third command for stopping processing of the processing unit and storing internal information on the processing unit in a save memory and a fourth command for loading the internal information stored in the save memory and starting the processing of the processing unit.

16. A control method according to claim 15, wherein the internal information is stored together with the identification information in the save memory by the third command and the fourth command is selected based on the identification information stored in the save memory.

17. A control method according to claim 12, wherein the network setting memory stores a plurality of sets of setting data for each of the plurality of processing units, out of the plurality of sets of setting data that are stored in the network setting memory, a set of setting data to be set synchronously with at least part of the plurality of processing units is supplied, and the control information includes a command for loading the set of setting data.

18. A control method according to claim 12, wherein the network setting memory stores a plurality of sets of setting data for each of the plurality of processing unit, the plurality of sets of setting data are supplied, and the control information includes a command for selecting and loading a set of setting data out of the plurality of sets of setting data.

19. A control method according to claim 12, wherein the network setting memory stores a set of setting data being respectively corresponding to each of the plurality of processing unit, is supplied, and the control method further includes rewriting the set of setting data in the network setting memory.

* * * * *